United States Patent
Pčolka et al.

(10) Patent No.: US 11,624,332 B2
(45) Date of Patent: Apr. 11, 2023

(54) CONTROL SYSTEM WITH DIAGNOSTICS MONITORING FOR ENGINE CONTROL

(71) Applicant: Garrett Transportation I Inc., Torrance, CA (US)

(72) Inventors: Matej Pčolka, Prague (CZ); David Hriadel, Prague (CZ); Martin Procházka, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/008,039

(22) Filed: Aug. 31, 2020

(65) Prior Publication Data
US 2022/0065184 A1    Mar. 3, 2022

(51) Int. Cl.
*F02D 41/14*    (2006.01)
*F02D 41/22*    (2006.01)

(52) U.S. Cl.
CPC ......... *F02D 41/1406* (2013.01); *F02D 41/22* (2013.01); *F02D 2041/1409* (2013.01); *F02D 2041/1412* (2013.01); *F02D 2041/1416* (2013.01); *F02D 2041/1429* (2013.01)

(58) Field of Classification Search
CPC ........ F02D 9/04; F02D 41/0007; F02D 41/14; F02D 41/1406; F02D 41/1446; F02D 41/22; F02D 2041/1409; F02D 2041/1412; F02D 2041/1416; F02D 2041/1429; G01M 15/00
See application file for complete search history.

(56) References Cited

U.S. PATENT DOCUMENTS

| | | | |
|---|---|---|---|
| 5,529,041 A | 6/1996 | Andrews | |
| 6,640,622 B2* | 11/2003 | Soliman | F02D 41/1401 73/114.31 |
| 7,266,442 B2* | 9/2007 | Ting | F02D 41/22 701/114 |
| 8,069,711 B2* | 12/2011 | Gebers | F02D 41/221 73/114.74 |
| 8,078,291 B2 | 12/2011 | Pekar et al. | |
| 8,649,884 B2 | 2/2014 | MacArthur et al. | |

(Continued)

OTHER PUBLICATIONS

Posada et al., "Review of LDV OBD Requirements Under the European, Korean, and Californian Emission Programs," International Council on Clean Transportation, Mar. 2016.

(Continued)

*Primary Examiner* — John Kwon
*Assistant Examiner* — Johnny H Hoang
(74) *Attorney, Agent, or Firm* — Seager, Tufte & Wickhem, LLP (57) ABSTRACT

New and/or alternative approaches to engine performance control that can account for the need to robustly monitor performance and/or operation of the physical plant and actuators thereof, while avoiding or limiting performance degradation. Model predictive control (MPC) or other control configuration such as proportional-integral-derivative control may be used to control the system by identifying a performance optimized control solution. In some examples, a modification to the performance optimized solution analysis is made to weight control solutions in favor of robust monitoring conditions. In other examples, the performance optimized solution is post-processed and modified to favor robust monitoring conditions.

18 Claims, 6 Drawing Sheets

(56) References Cited

U.S. PATENT DOCUMENTS

| | | | |
|---|---|---|---|
| 8,942,908 B2* | 1/2015 | Worthing | F02D 41/22 |
| | | | 123/198 D |
| 9,224,252 B1 | 12/2015 | Guo et al. | |
| 2006/0137346 A1* | 6/2006 | Stewart | F02D 41/1401 |
| | | | 60/605.2 |
| 2006/0229798 A1* | 10/2006 | Fukuzawa | F02D 41/222 |
| | | | 701/114 |
| 2007/0039589 A1* | 2/2007 | Stewart | F02D 41/1406 |
| | | | 123/703 |
| 2012/0116649 A1 | 5/2012 | Stewart et al. | |
| 2013/0067894 A1* | 3/2013 | Stewart | F02D 41/266 |
| | | | 60/295 |
| 2013/0111905 A1* | 5/2013 | Pekar | F02D 41/0235 |
| | | | 60/686 |
| 2015/0083096 A1 | 3/2015 | Zagone et al. | |
| 2015/0176478 A1* | 6/2015 | Wicks | F02M 35/10268 |
| | | | 60/599 |
| 2015/0275806 A1* | 10/2015 | Genslak | F02D 28/00 |
| | | | 701/104 |
| 2016/0076438 A1 | 3/2016 | Tabata et al. | |
| 2016/0146118 A1* | 5/2016 | Wichmann | F02C 9/50 |
| | | | 701/100 |
| 2016/0265468 A1 | 9/2016 | Takayanagi et al. | |
| 2017/0044971 A1 | 2/2017 | Racca | |
| 2017/0051684 A1* | 2/2017 | Lahti | F02D 41/0007 |
| 2017/0096952 A1 | 4/2017 | Yu et al. | |
| 2017/0152799 A1 | 6/2017 | Lee et al. | |
| 2017/0218860 A1* | 8/2017 | Pachner | F02D 41/1401 |
| 2018/0051638 A1 | 2/2018 | Wang et al. | |
| 2018/0149099 A1* | 5/2018 | Kothandaraman | F02M 26/06 |
| 2018/0202380 A1 | 7/2018 | Wang et al. | |
| 2018/0300191 A1* | 10/2018 | Bengea | G06F 11/0703 |

OTHER PUBLICATIONS

Bemporad, Alberto et al., "Model Predictive Control Toolbox for Use with MATLAB", Mar. 1, 2005, pp. 1-246, https://instruct.uwo.ca/engin-sc/391b/downloads/mpc.pdf, retrieved Apr. 30, 2020.

Zanoli, Silvia Maria et al., "The Importance of Cooperation and Consistency in Two-Layer Model Predictive Control", 2016 17th International Carpathian Control Conference (ICCC), IEEE, May 29, 2016, pp. 825-830.

European Extended Search Report for EP Application No. 21186857.5 dated Jan. 1, 2022, 13 pages.

* cited by examiner

CONTROL SYSTEM WITH DIAGNOSTICS MONITORING FOR ENGINE CONTROL

FIELD

The field is related to controllers and configurations for such controllers. More particularly, the field relates to controllers for managing system activity, including controllers for engines such as automotive engines.

BACKGROUND

Modern control systems incorporate monitoring of a range of system operations to ensure appropriate control over system outputs. Some systems use, for example, Model Predictive Control (MPC), Proportional Integral Control (PID), and other control methods to optimize performance of a controlled system. In many controlled systems, the output of the system, behavior of components in the system, and the performance of sensors within the system may each be monitored.

An issue that can arise when controlling a system for optimized performance is that monitoring demands, such as for monitoring the performance, health or other behavior of components and/or sensors in the system, may not be served by the optimal performance. For example, if monitoring demands call for a sensor output to be checked to ensure appropriate conditions, or actuator motion to be tested to ensure functionality, controlling solely for optimized performance may not allow monitoring demands to be met under robust monitoring conditions.

For example, a rechargeable battery in a hybrid vehicle may be monitored for internal impedance under "light load" to confirm health of the battery. However, the hybrid vehicle may be driven in such a manner as to make the desirable load conditions for checking internal impedance fall outside of optimized operating conditions. The optimized operations may therefore prevent robustly checking the battery internal impedance under the desired conditions.

As another example, consider a flow-controlling actuator that is expected to respond with a predefined degree of actuation (movement for example) in response to a change in an applied control signal. Whether the predefined degree of actuation actually takes place may be directly measured for some such actuators, while other actuators may not be placed/configured to allow direct measurement of actuation. Assuming the latter, actuation would need to be inferred from other measurable signals, such as pressure downstream and/or upstream of the flow-controlling actuator. The inference of actuation may rely on a model that is developed under controlled conditions, such as under a specific pressure, temperature, or flow rate conditions. If the system usage is optimized for performance purposes in a way that does not match the model used for inferring actuation, correct actuator performance may not be reliably inferred from other conditions.

One situation to illustrate the issue is that of low pressure exhaust gas recirculation (EGR) valve diagnostics. The valve normally opens at low-to-medium engine speed/load. When pressure upstream of the EGR valve is not much higher than the downstream pressure, EGR mass flow estimation would take place under low flow conditions, increasing the potential error and creating possible false detection of errors. Frequent faults can frustrate the user, leading to removal or disabling of the valve or related sensors.

In still another example, a sensor for detecting a measurable parameter may be operated in a system in which the measurable parameter can also be inferred from other conditions. For example, a pressure sensor associated with the air flow of an internal combustion engine may generate an output that can also be inferred by knowing other measurable parameters in the system, when those other measurable parameters are within defined verification bounds. Thus operation of the pressure sensor may be monitored and verified by reference to the other measurable parameters. However, if the engine is not operated in a manner consistent with the defined verification bounds, operation of the sensor cannot be verified robustly.

New and alternative control methods are needed to aid robust monitoring capabilities for these and other scenarios.

Overview

The present inventors have recognized, among other things, that a problem to be solved is the need for new and/or alternative approaches to system control that can account for the need to robustly monitor component, sensor or system behavior while avoiding or limiting degradation of performance. In some examples, a modification to the performance optimization process is made to weight control solutions in favor of robust monitoring conditions. In other examples, an optimized solution is post-processed and modified to favor robust monitoring conditions. Some examples may apply to control systems in a variety of contexts, including for example, manufacturing or power production plants, as well as vehicle powering systems and/or autonomous vehicle operations.

A first illustrative and non-limiting example takes the form of a configurable controller for controlling a physical plant having associated therewith a plurality of actuators for controlling operation of the physical plant and a plurality of sensors for observing a plurality of characteristics of the physical plant operations, the configurable controller comprising: a state observer configured to capture the current state of the physical plant; and an optimizer configured to use a model predictive control (MPC) for controlling the physical plant using at least the actuators; wherein the MPC comprises at least a first term associated with optimized performance of the physical plant, and at least one second term associated with performance of the physical plant within a predefined operation zone for robust monitoring.

Additionally or alternatively, the at least one second term includes a weighting value which increases with a distance from a monitoring frequency target.

Additionally or alternatively, the at least one second term includes a balancing term which increases with a distance from the predefined operation zone for robust monitoring.

Additionally or alternatively, the at least one second term is a product of the weighting value and the balancing term.

Additionally or alternatively, the weighting value has a zero lower limit and a non-zero upper limit.

Additionally or alternatively, the predefined operation zone for robust monitoring is determined by a set of boundary conditions for operation of the sensors.

Additionally or alternatively, the predefined operation zone for robust monitoring is determined by a set of boundary conditions for estimating an unmeasured variable or parameter.

Additionally or alternatively, the at least one second term is zero if the first term determines a performance solution within the predefined operation zone for robust monitoring.

Additionally or alternatively, the first illustrative and non-limiting example may be embodied as a method performing the steps of analysis that the system is configured to perform, wherein the method is performed in the context of a system as described.

A second illustrative and non-limiting example takes the form of a configurable controller for controlling a physical plant having associated therewith a plurality of actuators for controlling operation of the physical plant and a plurality of sensors for observing a plurality of characteristics of the physical plant operations, the configurable controller comprising: a state observer configured to capture the current state of the physical plant; and an operation optimizer configured to control the physical plant using at least the actuators; and a diagnostics optimizer configured to modify an output of the operation optimizer to adjust performance of the physical plant toward a predefined operation zone for robust monitoring; wherein the operation optimizer and diagnostics optimizer are configured to operate cooperatively to control at least some of the plurality of actuators and thereby control operation of the physical plant.

A third illustrative and non-limiting example takes the form of a method of operating a configurable controller adapted to control a physical plant having associated therewith a plurality of actuators for controlling operation of the physical plant and a plurality of sensors for observing a plurality of characteristics of the physical plant operations, the configurable controller being operably coupled to one or more of the plurality of actuators to thereby control the actuator, and operably coupled to one or more of the plurality of sensors to receive sensed data therefrom, the configurable controller comprising a state observer configured to capture the current state of the physical plant using the sensors, and an operation optimizer configured to control the physical plant using at least the actuators, and a diagnostics optimizer configured to modify an output of the operation optimizer to adjust performance of the physical plant toward a predefined operation zone for robust monitoring; the method comprising: the operation optimizer determining, using a current state of the physical plant, a first control solution for optimal performance; the diagnostics optimizer calculating an adjustment to the first control solution by determining: a current state of the system relative to a monitoring requirement; and a distance between the first control solution and a robust monitoring boundary condition; the diagnostics optimizer determining a second control solution, different from the first control solution by no more than a predetermined deviation; and the configurable controller issuing control signals, using the second control solution, to the actuators to operate the physical plant.

Additionally or alternatively to either the second or third illustrative, non-limiting examples, the diagnostics optimizer uses a weighting value which increases with a distance from a monitoring frequency target.

Additionally or alternatively to either the second or third illustrative, non-limiting examples, the diagnostics optimizer uses a balancing term which increases with a distance from the predefined operation zone for robust monitoring.

Additionally or alternatively to either the second or third illustrative, non-limiting examples, the diagnostics optimizer is configured to adjust performance using a product of the weighting value and the balancing term.

Additionally or alternatively to either the second or third illustrative, non-limiting examples, the predefined operation zone for robust monitoring is determined by a set of boundary conditions for operation of the sensors.

Additionally or alternatively to either the second or third illustrative, non-limiting examples, the predefined operation zone for robust monitoring is determined by a set of boundary conditions for estimating an unmeasured variable or parameter.

Additionally or alternatively to either the second or third illustrative, non-limiting examples, the diagnostics optimizer is configured to adjust performance of the physical plant within a predefined limited range, the predefined limited range determining a maximum total degradation of performance of the physical plant that the diagnostics optimizer can cause.

Additionally or alternatively to either the second or third illustrative, non-limiting examples, the diagnostics optimizer is configured to analyze a plurality of operating variables to adjust performance of the physical plant within a predefined limited range for each of the plurality of operating variables, and the predefined limited range comprises a plurality of individualized limits defining a maximum degradation of performance of the physical plant relative to each of the plurality of operating variables.

Additionally or alternatively to either the second or third illustrative, non-limiting examples, the diagnostics optimizer does not adjust performance of the physical plant if the operation optimizer determines a performance solution within the predefined operation zone for robust monitoring.

Additionally or alternatively to either the second or third illustrative, non-limiting examples, the operation optimizer is configured to use a model predictive control (MPC) for controlling the physical plant.

Another illustrative and non-limiting example takes the form of a vehicle comprising an internal combustion engine and a configurable controller as the above illustrative and non-limiting examples, or any of the above noted additions or alternatives thereto.

This overview is intended to provide an introduction to the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present innovation can be used in any of a range of control systems embodying a variety of control algorithms. Illustrative control algorithms can include, for example and without limitation, model predictive control (MPC), proportional control, proportional-integral-derivative (PID) control, linear quadratic regulator (LQR) control, as well as other control algorithms known to the skilled person. Some examples below will provide general context to the concept, though for illustrative purposes some examples are specific to the field of vehicle control systems, such as turbocharger and engine controls, as well as hybrid vehicle control and other vehicle functions. Some examples may focus on internal combustion engines, without limiting the innovation to that particular context.

Modern automotive control, including for example general vehicle control and/or control over particular systems such as the engine and associated components, generally makes use of a vehicle processing unit that controls a number of parameters to enhance engine performance. Model predictive control (MPC) is becoming well-established in the automotive area. Thanks to optimization-based background, MPC enables the user to formulate the control performance requirements (setpoint tracking quality, energy consumption and others) and technical/operational restrictions (physical constraints for valve positions and actuator values and others) into objective functions with accompanying constraints for the optimized variables. In automotive, these optimized variables usually correspond to manipulated variables, such as torques, normalized braking forces, valve openings etc. Using the internal model of the controlled system, the optimizer (optimization routine) finds the optimal values of the optimized variables over the specified prediction horizon such that the cost function is minimized, and the constraints are satisfied. Outputs of the optimizer are then used to control various actuators (valves, gates, and other components) which in turn control operation of the engine (physical plant).

Automotive emission regulations are increasingly getting stricter. To ensure that the original equipment manufacturers (OEMs) comply with the legislation requirements, onboard diagnostic systems (OBD) including failure detection, processing and announcing subsystems are implemented on the vehicle processing unit. To ensure that failure detection is robust, and false positive reports are minimized, a set of enabling conditions is defined such that if these conditions are satisfied, a detected potential failure can be robustly distinguished from normal behavior. These enabling conditions naturally restrict and shrink the time during which the monitoring is active, and failure can be detected. An In-Use Monitor Performance Ratio (IUMPR) may specify how often failure detection is performed for emissions standard compliance purposes. The purpose of these targets is to ensure that conditions are evaluated often enough such that a failure can be detected without unnecessary delays and the impacts of failure of emission relevant devices are remedied. Limiting monitoring to time periods that meet the enabling conditions is desirable, but can be contrary to the IUMPR needs, while operation in the confines of the enabling conditions may not be optimal from a performance perspective. The result is that vehicle control systems need to adapt to these additional requirements while continuing to provide desirable levels of performance. Outside of the automotive context, monitoring may also take place for any of a variety of purposes including ensuring optimized performance, confirming correct performance, error checking, and/or determining whether system components are all working properly or have been well maintained.

Figure 1:
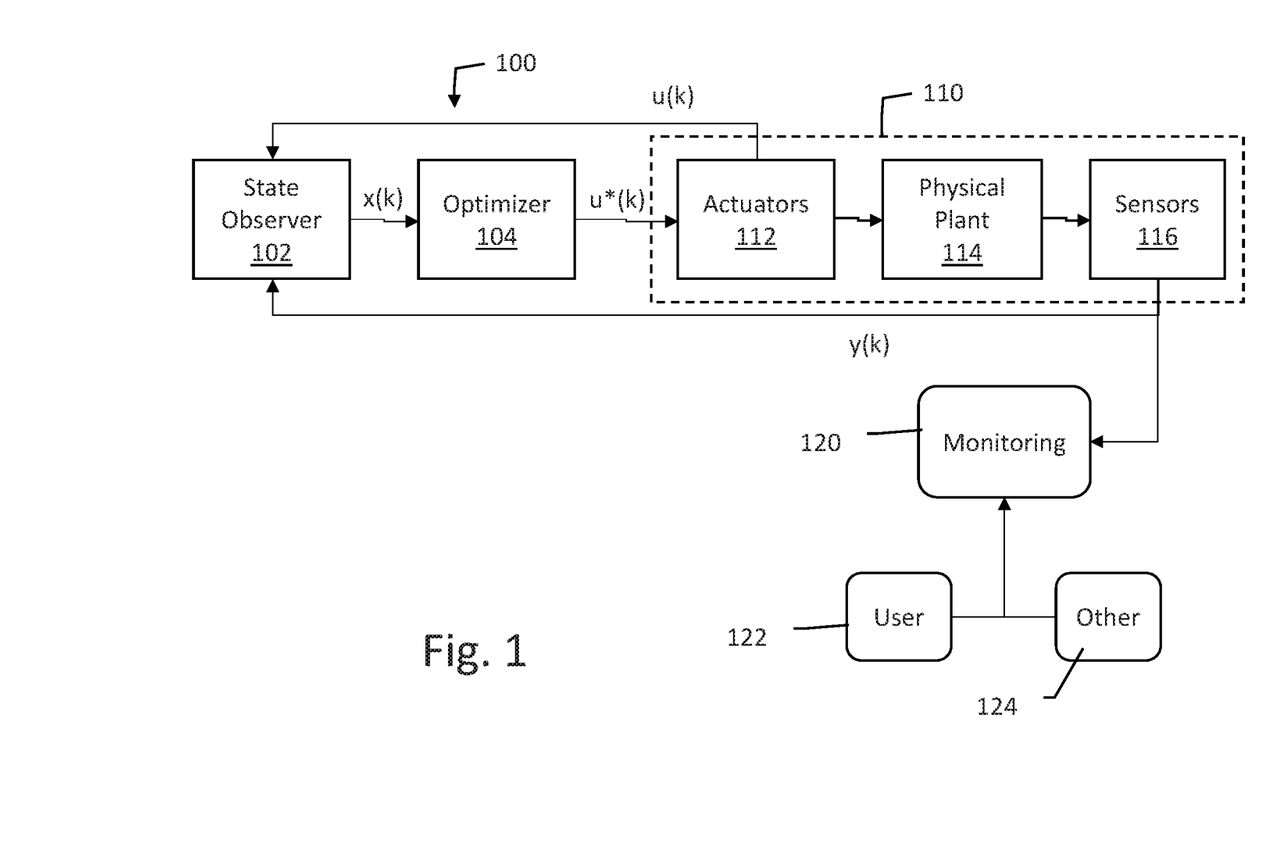
FIG. 1 shows a model of an operational control system.

FIG. 1 is illustrative. A control apparatus is shown at 100 and includes a state observer 102, which feeds a set of current state variables x(k) to the optimizer 104. The optimizer calculates a solution u*(k) that is used to generate control signals, which are conveyed to a set of actuators 112, which in turn control operation of the physical plant 114. The set of actuators may apply to, for example and without limitation, fuel injection control, engine brake control, aftertreatment control, exhaust gas recirculation (EGR) control, turbocharger control, throttle control, wastegate control, EGR valve, controls for a variable nozzle turbine, etc.

The physical plant 114 may be, for example and without limitation, an internal combustion engine, whether diesel or gasoline, or may be more broadly a vehicle control system such as in a gas-electric hybrid vehicle and vehicles operating without gas or diesel internal combustion engines (fuel cell, electric-only, etc.). Outside of the automotive context, the physical plant may be, for example and without limitation, a manufacturing line or facility, or a fixture within a manufacturing line or facility (for example, an extruder installation), an air control system (such as for a clean room or more broadly for other HVAC control), a catalyst control system, a boiler, a power generation plant, an airplane, locomotive or other vehicle, an autonomous vehicle, etc. Actuators may include valves, nozzles, dampers, turbines, compressors, vacuum units, fans, expellers, gates, motors, hydraulics, pumps, heating or cooling elements, and other elements known for use in such systems.

A plurality of sensors 116 is provided as shown in FIG. 1. Sensors 116 may include (in a vehicle engine having a turbocharger), for example, and without limitation, sensors detecting manifold absolute pressure (MAP), mass air flow (MAF), EGR flow, turbo speed, NOx, engine speed, fuel quantity, boost pressure, etc. Sensors adapted to other systems may be included instead, such as for control over an airplane, altimeter, ambient pressure/temperature, airspeed, etc. In other contexts, other sensors may be used. Such sensors may be configured to sample the underlying parameter being sensed and providing the result of such samples to the state observer 102.

A monitoring block is illustrated at 120, and may be used for capturing performance and/or diagnostics data. The monitoring block 120 may, in the automotive context, be an onboard diagnostics (OBD) system, though this need not be the case. The monitoring block 120 also receives outputs from the sensors 116 and may be used to compare the outputs from the sensors 116 to thresholds for alert, malfunction, etc. as the physical plant 114 operates. The monitoring block 120 may also receive or keep track of inputs or actions by a user 122, and/or other events that can be monitored 124 such as changes in load/demand or other disturbances. The monitoring block 120 may include, for example, one or more timers or memory locations for tracking frequency of monitoring operations.

The state observer 102 and optimizer 104 may be, for example, implemented in a microcontroller configured to operate on a set of stored instructions for performing a state observation and optimization routine. In another example, an application specific integrated circuit (ASIC) may provide state observer functions, which can include the capture or accumulation of data from the actuators 112 and/or sensors 116, which in turn may be read periodically by a microcontroller configured with stored instruction sets for performing an optimization calculation using, for example, the herein described MPC cost function. While it is shown separately for explanatory purposes, the monitoring block 120 may be integrated in and linked to the same microcontroller, or to a separate microcontroller, as desired, as the optimizer 104, which may be part of the overall vehicle processing unit (for a vehicle context) or system control processor (in the non-vehicle context).

Figure 2:
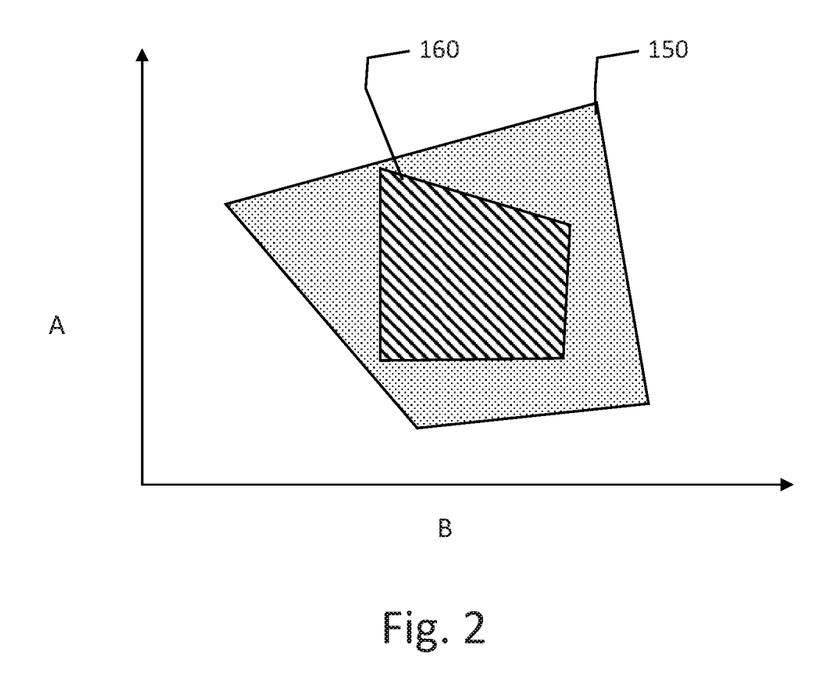
FIG. 2 illustrates in graphic form boundaries of operation and robust monitoring capabilities.

FIG. 2 shows in a generalized format an issue facing the design of system controllers. Given one or more parameters (here shown as simply A and B), a first mapping of allowable operating parameters may be bounded as shown at 150. In the traditional design, optimized operating solutions to the MPC cost function are allowed to appear anywhere within the first set of boundaries 150. However, one or more monitored variables (whether directly measured or estimated from other measurements) may only be robustly monitored within a smaller subset of the combinations of variables, indicated by the robust monitoring region 160. Outside of region 160, the monitoring function may not provide robust results leading potentially to false positives, that is, incorrect readings indicating potential failure. The boundaries of the robust monitoring region 160 may be understood as reflecting the boundaries for reliable or robust operation of a sensor, for example, or the boundary conditions for a model of operation that allows an unmeasured parameter to be inferred/calculated by reference to other measurable parameters.

To place FIG. 2 in a particular context, assume an automotive application having requirements for monitoring exhaust. If the output exhaust pressures are below a given lower limit, a monitor for emissions-related components may not be able to provide reliable readings, as for example may happen if the sample to sample variation in a measured particulate quantity is above a predefined limit when reading a sensor at low exhaust pressure. In another example, one or more monitored variables may be estimated from measured parameters if they cannot be directly measured. An unmeasured variable may be inferred or estimated using a model that relies on a set of predetermined conditions for accurate estimation. For example, a boost pressure may be estimated using other inputs to the system (compressor speed, humidity, temperature and pressure of pre-compressor airstream), however, such an estimate may require at least a minimum compressor speed, or no more than a maximum compressor speed, to be deemed reliable. Operation of the physical plant outside such predetermined conditions can impair accuracy of estimates of any unmeasured variables. If the monitored variable or parameter falls outside of a limit, a warning flag can be set, and troubleshooting may be required to determine the source of the warning. However, if the warning flag is a result of a non-robust reading or estimate, rather than an actual failure, the warning flag may be a false positive. Time spent troubleshooting false positives may be wasted, and repeat false positives may lead users to ignore warnings. Similar issues can arise in a variety of contexts outside of emissions monitoring as well as outside of the automotive context.

The boundary conditions for the robust monitoring region 160 may be referred to as the enabling conditions for monitoring. One approach to reducing false positive monitoring tests would be to only perform testing when the operating parameters are within the robust monitoring region 160.

For example, a monitoring limit may require that a parameter be monitored, for example, by sampling once per unit time (such as once per second, minute, etc., or other, shorter or longer time frame), or within a given functional unit (such as a quantity per use cycle). The basic MPC function is not built to consider this additional requirement, and performance optimized operation of the physical plant may not occur in a manner ensuring that monitoring-related measurements can occur while operating in a robust monitoring range. Monitoring requirements may require reading while operating, and sudden changes to operating parameters to ensure robust monitoring may impair optimized operation and may be undesirable to the user. Control systems built to manage both optimized operation and monitoring activities are desired.

A traditional MPC cost function formation may be as shown in Equation 1:

$$J_{MPC} = \min \sum_{k=1}^{P} \|y_{r,k} - y_k\|_{W_1} + \|u_{d,k} - u_k\|_{W_2} \quad \{\text{Eq. 1}\}$$

Where $u_{d,k}$ corresponds to the desired profile for the manipulated variable, $u_k$ stands for the manipulated variable, k denotes discrete time instance, and P stands for the prediction horizon of the predictive controller. Moreover, $y_{r,k}$ and $y_k$ represent the output reference and predicted values (as provided by the internal model of the physical plant used in the MPC), respectively, and $W_1$ and $W_2$ specify the weighting terms. For simplicity the k terms are omitted in subsequent equations herein. The traditional MPC cost function is minimized in operation in order to provide optimized performance.

In some examples, the direct control system may be modified to incorporate monitoring needs. For example, the MPC criterion explained above can be modified to incorporate monitoring needs. An illustrative, modified, MPC function may read as shown in Equation 2:

$$J_{MPC,OP} = \min \; \Sigma_{k=1} \quad \rho(\|y_r - y\|_{w_1} + \|u_d - u\|_{w_2} + \Sigma_{j=1 \ldots N_E} \|d_{ECR,j}\|_{w_3}) \quad \{\text{Eq. 2}\}$$

Where $d_{ECR,j}$ represents a slack variable expressing the distance from the robust monitoring area with respect to the j-th enabling condition signal. The robust monitoring slack variable expression can be (but is not limited to) as shown in Equation 3:

$$d_{ECR,j} = \begin{cases} s_{E,j} - s_{U,E,j} & s_{E,j} > s_{U,E,j} \\ 0 & s_{U,E,j} \geq s_{E,j} \geq s_{L,E,j} \\ s_{L,E,j} - s_{E,j} & s_{L,E,j} > s_{E,j} \end{cases} \quad \{\text{Eq. 3}\}$$

Here, $s_{E,j}$ is the j-th enabling condition signal, $j \in \{1, 2, \ldots, N_E\}$, $N_E$ is the number of enabling condition signals related to monitoring; and $\{s_{L,E,j}, s_{U,E,j}\}$ specify the lower and upper bound for the corresponding robust monitoring interval. This definition for the slack variable may be modified, as desired, and any other suitable expression of the distance from the robust monitoring area can be used for $d_{ECR,j}$ as well. The slack variable may serve as a balancing term that accounts for the distance between the robust monitoring area and the implemented operating configuration.

The weighting term $W_3$ in Equation 2 adjusts with the need for monitoring based on monitoring targets. In an example, a target $R^*_{IUR}$ can be specified for each monitor, and $W_3$ can be expressed as a function of the current monitoring status $R_{IUR}$ and its target $R^*_{IUR}$. The expression can read (but is not limited to) Equation 4:

$$W_3 = \max(0, \min(\overline{\omega}, (R^*_{IUR} - R_{IUR})\omega)) \quad \{\text{Eq. 4}\}$$

In the expression for $W_3$, $\overline{\omega}$ is the upper limit for the weight $W_3$ and $\omega$ is the scaling factor, both of which may be chosen by the user; as used here, the weighting value has a lower limit of zero. In this way, $W_3$ reflects that the further away from the monitoring target the controller gets, the more it "cares" about improving the ratio. If the operating criteria are within the robust monitoring range, that is, if the monitoring target is satisfied, $W_3$ is zero and the MPC will operate normally.

Figure 3:
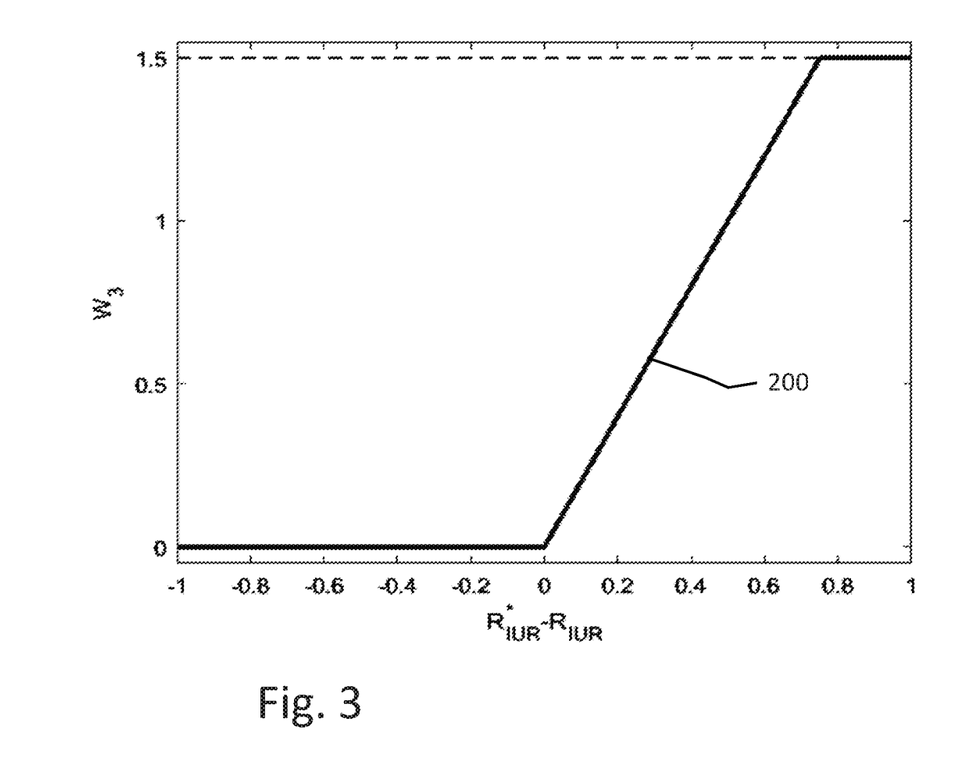
FIG. 3 illustrates in graphic form a weighting function.

FIG. 3 shows graphically how $W_3$ may be calculated for a range of values for the difference of $(R^*_{IUR}-R_{IUR})$ in a simple example. When $R_{IUR}$ is greater than $R^*_{IUR}$, the weighting value is zero, as indicated at line 200. If $R_{IUR}$ is less than $R^*_{IUR}$, as shown on the right side of the graph, $W_3$ is increased to its maximum value, here 1.5. So, for example, assuming that $R_{IUR}$ is defined as a period from the last monitoring sample (such as 30 seconds), as the period from the last monitoring sample grows, the weighting factor $W_3$ becomes relevant, and increases from 0 to 1.5. The expressions of $R^*_{IUR}$ and $R_{IUR}$ may be selected to account for different demands of the monitoring target, in combination with the weighting factor. If more than one distinct monitoring target is involved, the expression of $W_3$ may comprise additional terms.

For example, $W_3$ may be operable (using a 30 second monitoring target as an illustrative example) to be zero for 15 seconds after a last monitoring sample is taken, and then increases from zero to its maximum value during an interval from 15 seconds to 30 seconds. A linear increase is shown in FIG. 3; other functional relationships (such as an exponential) may be used instead, if desired.

Figure 4:
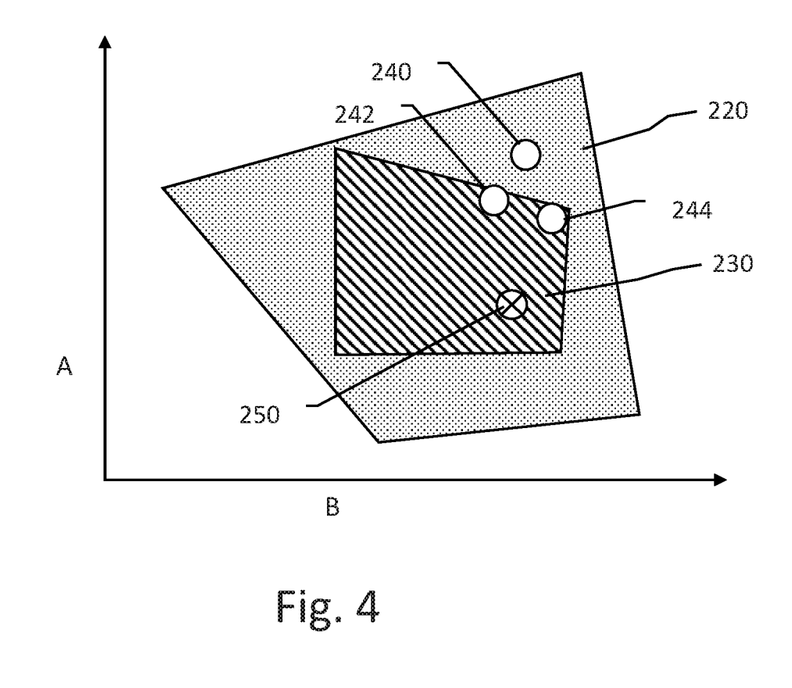
FIG. 4 illustrates in graphic form effects of a weighting function.

The effect of this modification to the MPC cost function can be seen in FIG. 4. In the simplified graphic, two variables A and B are considered. A single variable may be contemplated instead, or more than two variables, as desired. A traditional MPC function, may calculate an optimal solution 240. However, while this solution 240 falls within the allowable operating parameters bounded by shape 220, the solution 240 lies outside of the robust monitoring range 230. This may be acceptable operation in a temporary sense, but it does not ensure operation relative to monitoring targets within an optimal monitoring range. The modified operation, incorporating monitoring targets, shifts over time from the optimal performance solution 240 toward operation in the robust monitoring range. The modified MPC cost function may, for example, adjust operation to invoke one or the other of solutions 242 or 244 (which are shown merely as examples) depending on which is more optimal in terms of performance. If, on the other hand, the traditional MPC function determines an optimal performance solution that is within the robust monitoring boundaries, such as the solution at 250, the $d_{ECR,j}$ term will be zero, negating any influence of monitoring targets on the MPC controller output.

A distinction worthy of understanding in context of operating an automotive system is that between adjusting performance to ensure emissions standards are met, and adjusting performance to ensure that emissions performance can be accurately read and analyzed. The primary goal is the latter, ensuring that emissions performance can be accurately read and analyzed, which in turn can be useful to also ensure that performance meets emissions standards. The concrete result of this analysis will be modifications to engine operation that aid in ensuring robust (and thereby more accurate) performance monitoring. The same distinction also applies in other monitoring system contexts.

Another illustrative example uses a more indirect approach to modifying the operating parameters after an MPC function is calculated. In this example, an MPC cost criteria analysis according to Equation 1 is performed to yield an optimized input sequence defined as shown in Equation 5:

$$u^*_{MPC} = \mathrm{argmin} J_{MPC}(u) \qquad \{\text{Eq. 5}\}$$

This output can be considered a first stage operation. Next, in a second stage of the operation, the distance from the robust monitoring area is minimized while limiting the modification of the optimized input by a user defined threshold according to Equation 6:

$$u^*_{MPC,OP} = \underset{J_{MPC}(u)-J^*_{MPC} \leq \Delta J}{\mathrm{argmin}} d_{ECR}(u) \qquad \{\text{Eq. 6}\}$$

Where $\Delta J$ represents the user defined maximum performance degradation, to yield an updated control solution using $d_{ECR}$ to minimize the distance to the robust monitoring area. The $d_{ECR}$ term can again be a slack variable, as described above in Equation 3, for example. Again, the definition in Equation 3 for the slack variable may be modified, as desired, and any other suitable expression of the distance from the robust monitoring area can be used for $d_{ECR}$ as well. The slack variable may serve as a balancing term that accounts for the distance between the robust monitoring area and the implemented operating configuration.

An illustrative, non-limiting expression for $\Delta J$ may be as shown in Equation 7:

$$\Delta J = \max(0, \min(\bar{\delta}, (R^*_{IUR}-R_{IUR})\delta)) \qquad \{\text{Eq. 7}\}$$

Where $\bar{\delta}$ is the maximum allowed control performance degradation and $\delta$ is nominal value for control performance degradation allowance. The monitoring target terms, including the target $R^*_{IUR}$ and the existing $R_{IUR}$ are as defined above. Any other suitable function of the current state and the monitoring target is also possible.

This two-stage approach can be operated by application to an overall performance quantifier, or multiple sub-constraints may be applied where J has multiple terms. For example, if J comprises more than one term, each individual term within the J expression can be analyzed separately, or the overall summation of J can be analyzed.

With this two-stage approach, the base MPC function is not modified, but its outputs can be modified if $\Delta J$ is non-zero before those outputs are implemented in the physical plant. The two-stage approach may be understood as including a performance optimizer that runs the MPC function, and a diagnostics optimizer that cooperatively works with the performance optimizer. The diagnostics optimizer can adjust the settings determined by the performance optimizer to adjust performance of the physical plant toward a predefined operation zone for robust monitoring. As a result, the operation optimizer and diagnostics optimizer are configured to operate cooperatively to control at least some of the plurality of actuators and thereby control operation of the physical plant.

Figure 5:
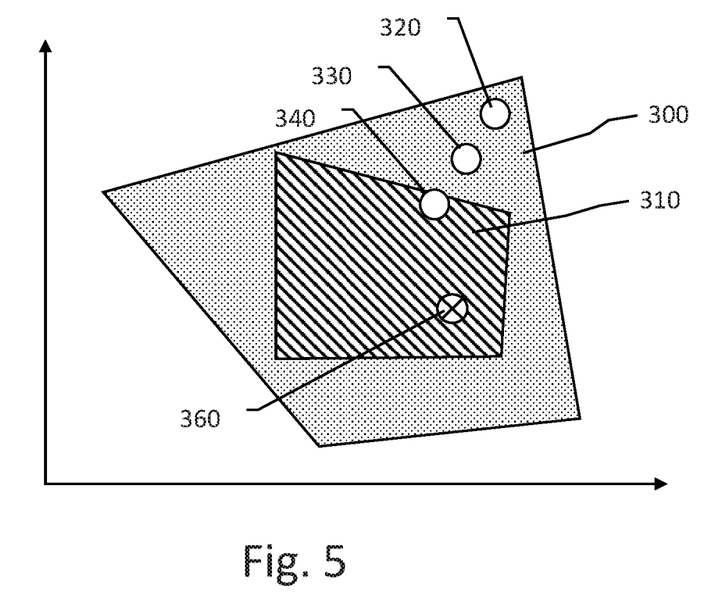
FIG. 5 illustrates in graphic form a second illustrative method.

FIG. 5 is illustrative. Here, the control function (MPC, PID, or other method) may yield an output shown at 320, within the allowable boundaries of operation 300, but away from the robust monitoring area 310. When $\Delta J$ is zero, the second stage operation is not performed. For solution 320, this may be because the monitoring function is not, at a given point in time, required to run. As the monitoring become relevant, such as if there is a need for a sensing operation or other monitor be performed (within a defined time horizon, for example), the second stage becomes active, moving performance to 330 and then 340 in a sequence of iterations. If, instead, the original control solution (whether MPC, PID or other) is within both the allowable operating boundary 300 as well as the robust monitoring area 310, as shown at 360, ΔJ would be zero, but this time because the distance to the robust monitoring area is zero. The second stage of the analysis would then have no effect.

While FIG. 5 shows that the second stage adjusts the performance of the system under control into the robust monitoring zone, this may not always be the case. For example, the maximum allowed performance degradation limits the second stage adjustment. Therefore, if the optimized solution is too far from the robust monitoring boundary, performance may be adjusted toward, but not necessarily into, the robust monitoring zone. Even so, it may generally be expected that monitoring system errors and false positives become less likely as the performance is adjusted toward the robust monitoring zone.

Figure 6:
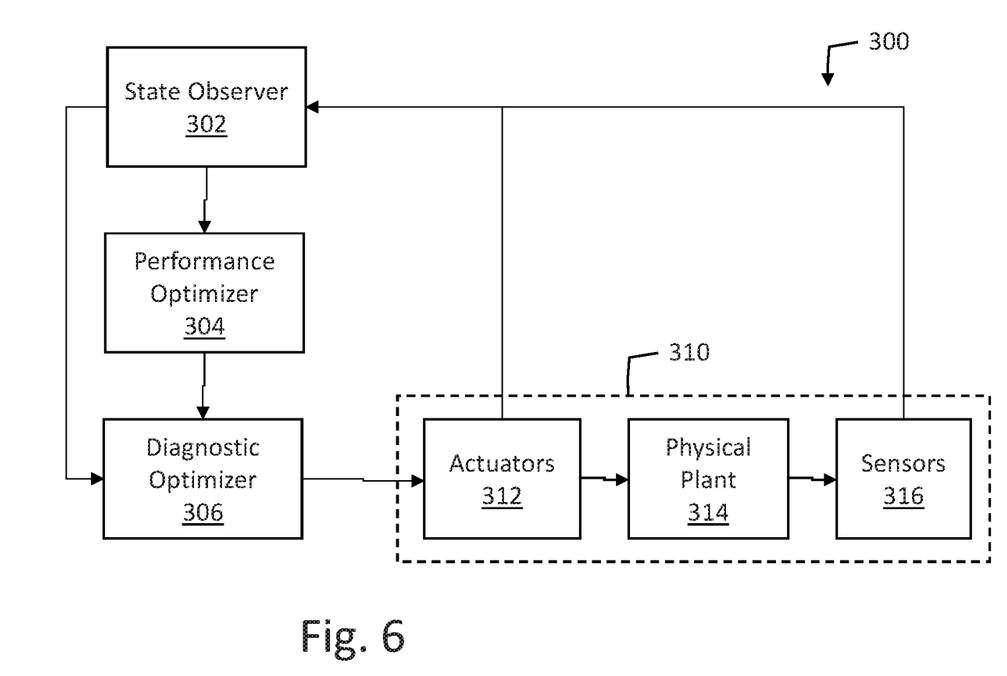
FIG. 6 shows another model of an operational control system.

FIG. 6 is an updated version of FIG. 1 reflecting a two stage control configuration and operation. A state observer again gathers data from the controlled system 310, such as information from one or more sensors 316 and/or actuators 312 that are associated with the physical plant 314. Sensors 316 may (both here and in FIG. 1) also sense ambient conditions, not just those of the physical plant, as well as user inputs (such as whether a gas pedal is being depressed, for example).

Control solutions are generated in a two stage optimizer in the example of FIG. 6. A performance optimizer 304 uses a traditional, monitoring-system independent approach to generating a control solution, such as by using MPC, PID, or other control methods/calculations. A diagnostics optimizer 306 receives a first solution from the performance optimizer 304, and then determines an adjustment (or possibly no adjustment if none is needed) to the first solution for monitoring purposes. For example, the diagnostics optimizer may determine an adjustment to the first control solution using monitoring system factors which may include inputs taken from the state observer 302. The adjustment may be calculated using, for example, a monitoring system demand reflecting whether monitoring is currently needed due to, for example, monitoring frequency requirements. The adjustment may also be calculated using a distance from the robust monitoring area. Further the adjustment may be capped using a user defined, or otherwise predefined, cap on deviation or reduction in overall performance. The analyses in the diagnostic optimizer 306 may be performed in terms of its effect on overall system performance, or on an element by element basis where individual elements of overall performance are separately assessed, for example when calculating deviation from optimal performance. Finally the diagnostics optimizer 306 generates a second control solution that is then applied to the physical plant 314 using the actuators 312. In an example, each of the performance optimizer 304 and diagnostic optimizer 306 use a cost minimizing approach such as an MPC analysis. In other examples, one of the optimizers 304/306 is configured for MPC, while the other optimizer 306/304 uses a different control method, such as PID control. For example, the diagnostic optimizer 306 may use an MPC approach while the performance optimizer 304 is configured to use PID control.

In one illustrative example, two actuators influence the output of a physical plant in the same way. Assume one actuator (A1) is very efficient in operating conditions OC1 but less efficient in operating conditions OC2 while the other actuator (A2) is highly efficient in operating conditions OC2 and less efficient in operating conditions OC1. When designing a nominal MPC cost function minimizing reference tracking error, cost of operation of A1 and cost of operation of A2 would be integrated in the MPC cost function. Since the actuators A1, A2 complement each other, one or the other would be used depending on the operating conditions in which the system currently operates: A1 would be preferred in OC1, A2 would be chosen in OC2. However, monitoring of proper functionality of any of the actuators can be executed only if that actuator is actively used. If the operating conditions naturally vary between OC1 and OC2, both actuators are used equally, and their proper functionality is often checked. However, if (for example) the system happens to operate for longer period in the OC1 area, A2 will rest for that period and its monitoring will not be executed. If a target for A2 monitoring frequency is specified, it might not be satisfied with the nominal MPC. Either of the above solutions may be used to modify operation only as often as required by the monitoring frequency target and according to the allowed performance degradation, by shifting operation as required by the monitoring frequency target between OC1 and OC2, or by preferring to use the actuator whose monitoring is currently requested.

The above detailed description includes references to the accompanying drawings, which form a part of the detailed description. The drawings show, by way of illustration, specific embodiments. These embodiments are also referred to herein as examples. In this document, the terms "a" or "an" are used, as is common in patent documents, to include one or more than one, independent of any other instances or usages of "at least one" or "one or more," for example. Moreover, in the following claims, numerical designations (first, second, third, etc.) are used merely as labels, and are not intended to impose numerical requirements on their objects. In the event of inconsistent usages between this document and any documents so incorporated by reference, the usage in this document controls.

The above description is intended to be illustrative, and not restrictive. For example, the above-described examples (or one or more aspects thereof) may be used in combination with each other. Other embodiments can be used, such as by one of ordinary skill in the art upon reviewing the above description. Some examples can include elements in addition to those shown or described. The present inventors also contemplate examples using any combination or permutation of those elements shown or described (or one or more aspects thereof), either with respect to a particular example (or one or more aspects thereof), or with respect to other examples (or one or more aspects thereof) shown or described herein.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of protection should be determined with reference to the appended claims, along with the full scope of equivalents to which such claims are entitled.

What is claimed is:

1. A configurable controller for controlling a physical plant having associated therewith a plurality of actuators for controlling operation of the physical plant and a plurality of sensors for observing a plurality of characteristics of the physical plant operations, the configurable controller comprising:
   a state observer configured to capture a current state of the physical plant using data from the plurality of sensors; and
   an optimizer configured to use a model predictive control (MPC) cost function for controlling the physical plant using at least the actuators and data from the state observer and the plurality of sensors;
   wherein at least one of the plurality of sensors is adapted to monitoring of a sensed parameter wherein the monitoring provides robust results only when operating parameters of the physical plant remain within a predefined robust monitoring region; and
   wherein the MPC cost function of the optimizer comprises at least a first term associated with optimized performance of the physical plant, and at least one second term that includes a balancing term which increases with a distance of the operating parameters of the plant from the robust monitoring region.

2. The configurable controller of claim 1 wherein the monitoring takes place by sampling the sensed parameter in accordance with a monitoring frequency target and the at least one second term includes a weighting value which increases with the period from the last monitoring sample.

3. The configurable controller of claim 2, wherein the at least one second term is a product of the weighting value and the balancing term.

4. The configurable controller of claim 2 wherein the weighting value has a zero lower limit and a non-zero upper limit.

5. The configurable controller of claim 1 wherein the predefined robust monitoring region is determined by a set of boundary conditions for operation of the sensors.

6. The configurable controller of claim 1 wherein the predefined robust monitoring region is determined by a set of boundary conditions for estimating an unmeasured variable or parameter.

7. The configurable controller of claim 1 wherein the at least one second term is zero if the operating parameters of the plant are in the robust monitoring region.

8. A vehicle comprising an internal combustion engine and a configurable controller as in claim 1, wherein the configurable controller is used to manage operations of the internal combustion engine.

9. A configurable controller for controlling a physical plant having associated therewith a plurality of actuators for controlling operation of the physical plant and a plurality of sensors for observing a plurality of characteristics of the physical plant operations, the configurable controller comprising:
   a state observer configured to capture the current state of the physical plant using data from the plurality of sensors; and
   an operation optimizer configured to control the physical plant using at least the actuators and data from the state observer and the plurality of sensors; and
   a diagnostics optimizer;
   wherein at least one of the plurality of sensors is adapted to monitoring of a sensed parameter wherein the monitoring provides robust results only when operating parameters of the physical plant remain within a predefined robust monitoring region;
   wherein the diagnostics optimizer is configured to modify an output of the operation optimizer to adjust performance of the physical plant by minimizing a balancing term which increases with a distance of the operating parameters of the plant from the robust monitoring region.

10. The configurable controller of claim 9 wherein the diagnostics optimizer uses a weighting value, the monitoring takes place by sampling the sensed parameter, and the weighting value increases with the period from the last monitoring sample.

11. The configurable controller of claim 10, wherein the diagnostics optimizer is configured to adjust performance using a product of the weighting value and the balancing term.

12. The configurable controller of claim 9 wherein the predefined robust monitoring region is determined by a set of boundary conditions for operation of the sensors.

13. The configurable controller of claim 9 wherein the predefined robust monitoring region is determined by a set of boundary conditions for estimating an unmeasured variable or parameter.

14. The configurable controller of claim 9 wherein the diagnostics optimizer is configured to adjust performance of the physical plant within a predefined limited range, the predefined limited range determining a maximum total degradation of performance of the physical plant that the diagnostics optimizer can cause.

15. The configurable controller of claim 9 wherein the diagnostics optimizer is configured to analyze a plurality of operating variables to adjust performance of the physical plant within a predefined limited range for each of the plurality of operating variables, and the predefined limited range comprises a plurality of individualized limits defining a maximum degradation of performance of the physical plant relative to each of the plurality of operating variables.

16. The configurable controller of claim 9 wherein the diagnostics optimizer does not adjust performance of the physical plant if the operation optimizer determines a performance solution within the predefined robust monitoring region.

17. The configurable controller of claim 9 wherein the operation optimizer is configured to use a one of PID, LQR, or MPC methods for controlling the physical plant.

18. A method of operating a configurable controller adapted to control a physical plant;

the physical plant having associated therewith a plurality of actuators for controlling operation of the physical plant and a plurality of sensors for observing a plurality of characteristics of the physical plant operations, wherein at least one of the plurality of sensors is adapted to monitoring of a sensed parameter, the monitoring providing robust results only when operating parameters of the physical plant remain within a predefined robust monitoring region, the configurable controller being operably coupled to one or more of the plurality of actuators to thereby control the actuators, and operably coupled to one or more of the plurality of sensors to receive sensed data therefrom, the configurable controller comprising a state observer configured to capture a current state of the physical plant using the data from the plurality of sensors, and an operation optimizer configured to control the physical plant using at least the actuators and data from the state observer and the plurality of sensors, and a diagnostics optimizer configured to modify an output of the operation optimizer; the method comprising:

the operation optimizer determining, using the current state of the physical plant, a first control solution for optimal performance;

the diagnostics optimizer calculating an adjustment to the first control solution by determining:

a current state of the system relative to a monitoring requirement; and a distance between the first control solution and a boundary of the robust monitoring region;

the diagnostics optimizer determining a second control solution, different from the first control solution by no more than a predetermined deviation using the adjustment; and the configurable controller issuing control signals, using the second control solution, to the actuators to operate the physical plant.

\* \* \* \* \*